(12) United States Patent
Serita et al.

(10) Patent No.: US 9,542,413 B2
(45) Date of Patent: Jan. 10, 2017

(54) STORED DATA DEDUPLICATION METHOD, STORED DATA DEDUPLICATION APPARATUS, AND DEDUPLICATION PROGRAM

(75) Inventors: Susumu Serita, Tokyo (JP); Yasuhiro Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 14/349,561

(22) PCT Filed: Oct. 6, 2011

(86) PCT No.: PCT/JP2011/073085
§ 371 (c)(1),
(2), (4) Date: Apr. 11, 2014

(87) PCT Pub. No.: WO2013/051129
PCT Pub. Date: Apr. 11, 2013

(65) Prior Publication Data
US 2014/0229452 A1    Aug. 14, 2014

(51) Int. Cl.
*G06F 17/30* (2006.01)
*G06F 3/06* (2006.01)
*G06F 11/14* (2006.01)

(52) U.S. Cl.
CPC ....... *G06F 17/30156* (2013.01); *G06F 3/0641* (2013.01); *G06F 11/1453* (2013.01)

(58) Field of Classification Search
CPC ............ G06F 17/30156; G06F 11/1453; G06F 17/30303; G06F 3/0641
See application file for complete search history.

(56) References Cited

U.S. PATENT DOCUMENTS 7,567,188 B1 * 7/2009 Anglin .................. G06F 3/0608
341/63
8,140,491 B2 * 3/2012 Mandagere ....... G06F 17/30489
707/692
(Continued)

FOREIGN PATENT DOCUMENTS

JP         2010-515114 A       5/2010

OTHER PUBLICATIONS

PCT International Search Report on application PCT/JP2011/073085 mailed Nov. 22, 2011; 3 pages.

*Primary Examiner* — Scott A Waldron
*Assistant Examiner* — Alexander Khong
(74) *Attorney, Agent, or Firm* — Foley & Lardner LLP

(57) ABSTRACT

Method of dividing data to be stored in storage device into data fragments; recording the data by using configurations of divided data fragments; judging whether identical data fragments exist in data fragments; when it is judged that identical data fragments exist, storing one of the identical data fragments in storage area of the storage device, and generating and recording data-fragment attribute information indicating an attribute unique to the data fragment stored; upon receipt of request to read data stored in the storage area of the storage device, acquiring the configurations of the data fragments forming the read-target data, reading the corresponding data fragments from the storage area of the storage device, and restoring the data; acquiring and coupling the recorded data fragments to generate concatenation target data targeted for judgment on whether chunk concatenation is possible or not, and detecting whether the concatenation target data has a repeated data pattern.

13 Claims, 13 Drawing Sheets

(56) References Cited

U.S. PATENT DOCUMENTS

| | | |
|---|---|---|
| 8,214,517 B2 | 7/2012 | Dubnicki et al. |
| 2008/0270436 A1* | 10/2008 | Fineberg ........... G06F 17/30097 |
| 2009/0313248 A1 | 12/2009 | Balachandran et al. |
| 2012/0131025 A1* | 5/2012 | Cheung ............. G06F 17/30159 |
| | | 707/755 |

* cited by examiner

CHUNK MANAGEMENT TABLE 300 (216) (BEFORE CHUNK CONCATENATION)

| CHUNK ID | HASH VALUE | CHUNK SIZE | NUMBER OF DUPLICATIONS | STORAGE LOCATION |
|---|---|---|---|---|
| 1 | 0xABCD | 1.1KB | 5 | L_1 |
| 2 | 0x41A8 | 1.2KB | 4 | L_2 |
| 3 | 0x13EE | 0.8KB | 3 | L_3 |
| ... | ... | ... | ... | ... |

CHUNK MANAGEMENT TABLE 300 (216) (AFTER CHUNK CONCATENATION)

| CHUNK ID | HASH VALUE | CHUNK SIZE | NUMBER OF DUPLICATIONS | STORAGE LOCATION |
|---|---|---|---|---|
| 1 | 0xABCD | 1.1KB | 5 | L_1 |
| 2 | 0x41A8 | 1.2KB | 4 | L_2' |
| 3 | 0x13EE | 0.8KB | 3 | L_3' |
| ... | ... | ... | ... | ... |
| 9 | 0xF928 | 3.1KB | 3 | L_1 |

OUTLINE OF DATA RELOCATION ON MEMORY DEVICE 123

(a) BEFORE CHUNK RELOCATION

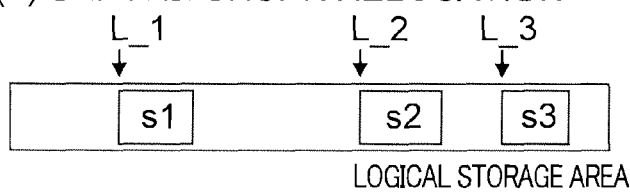

LOGICAL STORAGE AREA (b) AFTER CHUNK RELOCATION

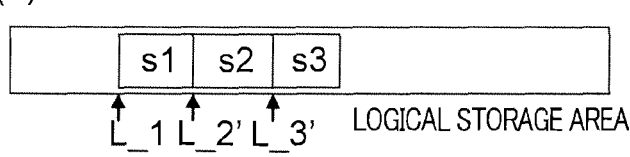

LOGICAL STORAGE AREA

FIG. 4

FILE MANAGEMENT TABLE 500 (215) (BEFORE CHUNK CONCATENATION PROCESSING)

| FILE NAME /501 | FILE SIZE /502 | NUMBER OF CHUNKS /503 | CONSTITUTING-CHUNKS ID /505 |
|---|---|---|---|
| sample1.txt | 20.4KB | 10 | 1-2-3-4-1-2-3-5-6-1 |
| sample2.txt | 10.5KB | 5 | 7-8-4-2-5 |
| ... | ... | ... | ... |

FILE MANAGEMENT TABLE 500 (215) (AFTER CHUNK CONCATENATION PROCESSING)

| FILE NAME /501 | FILE SIZE /502 | NUMBER OF CHUNKS /503 | CONSTITUTING-CHUNKS ID /505 |
|---|---|---|---|
| sample1.txt | 20.4KB | 6 | 9-4-9-5-6-1 |
| sample2.txt | 10.5KB | 5 | 7-8-4-2-5 |
| ... | ... | ... | ... |

CHUNK PATTERN INFORMATION TABLE 600 (223)
(AFTER DETECTION OF REPEATED CHUNK PATTERN)

| CHUNK PATTERN | LENGTH | NUMBER OF APPEARANCES | APPEARANCE POSITION |
|---|---|---|---|
| 1-2-3 | 3 | 3 | 1,100,212 |
| 5-6-7 | 3 | 3 | 32,51,160 |
| 1-2-3-1-5-6 | 6 | 2 | 20,312 |
| ... | ... | ... | ... |

FIG. 6A

CHUNK PATTERN INFORMATION TABLE 600 (223)
(PATTERN WITH SAME CHUNKS IS DIVIDED)

| CHUNK PATTERN | LENGTH | NUMBER OF APPEARANCES | APPEARANCE POSITION |
|---|---|---|---|
| 1-2-3 | 3 | 3 | 1,100,212 |
| 5-6-7 | 3 | 3 | 32,51,160 |
| 1-2-3 | 3 | 2 | 20,312 |
| 1-5-6 | 3 | 2 | 23,315 |
| ... | ... | ... | ... |

| CHUNK PATTERN | LENGTH | NUMBER OF APPEARANCES | APPEARANCE POSITION |
|---|---|---|---|
| 1-2-3 | 3 | 5 | 1,20,100,212,312 |
| 5-6-7 | 3 | 3 | 32,51,160 |
| 1-5-6 | 3 | 2 | 23,315 |
| ... | ... | ... | ... |

FIG. 6B

CONCATENATED CHUNK INFORMATION TABLE 700 (224)

| CONCATENATED CHUNK ID /701 | SUB-CHUNKS ID /702 | NUMBER OF APPEARANCES /703 | UPDATE DATE /704 |
|---|---|---|---|
| 9 | 1-2-3 | 5 | JULY 7, 2011 |
| 14 | 5-6-7 | 3 | JULY 7, 2011 |
| ... | ... | ... | ... |

CHUNK MANAGEMENT TABLE 300 (216) ACCORDING TO
SECOND EMBODIMENT (BEFORE CHUNK CONCATENATION)

| CHUNK ID /301 | HASH VALUE /302 | SKIP SIZE /1403 | CHUNK SIZE /303 | NUMBER OF DUPLICATIONS /304 | STORAGE LOCATION /305 |
|---|---|---|---|---|---|
| 1 | 0xABCD | 0 | 1.1KB | 3 | L_1 |
| 2 | 0x41A8 | 0 | 1.2KB | 4 | L_2 |
| 3 | 0x13EE | 0 | 0.8KB | 3 | L_3 |
| ... | ... | ... | ... | ... | ... |

CHUNK MANAGEMENT TABLE 300 (216) ACCORDING TO
SECOND EMBODIMENT (AFTER CHUNK CONCATENATION)

| CHUNK ID /301 | HASH VALUE /302 | SKIP SIZE /1403 | CHUNK SIZE /303 | NUMBER OF DUPLICATIONS /304 | STORAGE LOCATION /305 |
|---|---|---|---|---|---|
| 1 | 0xABCD | 2.3KB | 1.1KB | 3 | L_1 |
| 9 | 0x41A8 | 0 | 3.1KB | 3 | L_1 |
| ... | ... | ... | ... | ... | ... |

STORED DATA DEDUPLICATION METHOD, STORED DATA DEDUPLICATION APPARATUS, AND DEDUPLICATION PROGRAM

TECHNICAL FIELD

The present invention relates to a stored data deduplication method, an information processing apparatus, and a deduplication program, and relates to a stored data deduplication method, an information processing apparatus, and a deduplication program which are capable of reducing the amount of data stored in a recording medium such as a hard disk by deduplicating the stored data.

BACKGROUND ART

The quantity of digital data produced by companies and the like are increasing year after year. With this, storage capacity necessary for storing the digital data has been increased, causing escalation of data management costs. Against such a background, storage products and techniques with a data reduction function called "deduplication" are drawing attention.

General duplication processing is performed through the following three processes.
(1) Chunking Process: Divide data stored in a storage device into data fragments called chunks.
(2) Duplication Judgment Process: Judge whether the storage device has the same chunk as any of the chunks newly created (whether data are stored in a duplicated manner).
(3) Metadata Creation Process: Store only a non-duplicate chunk out of the newly-created chunks in the storage device, and create information (called "metadata" hereinbelow) to be used in the duplication judgment processing and in restoration of original data from the stored chunk data.

In the above processing, for multiple duplicate chunks, only one piece of real data is stored in the storage device. Thus, considerable data reduction can be expected in a case where approximately the same data appear many times, such as a case of backup data.

In such deduplication processing, a chunking method is an important factor that determines the performance. Generally, the smaller the chunk size of each created chunk, the higher the rate of real data that can be reduced (deduplication rate). However, too small chunk size leads to a problem of increasing the amount of metadata necessary for management of chunks as well as the amount of time required for restoration of original data from the chunks. Conversely, large chunk size can decrease the amount of metadata on chunks as well as the amount of time required for data restoration, but leads to a problem of lowering the deduplication rate.

As a countermeasure against this dilemma regarding chunk size, a technique is known which applies multiple chunk sizes according to data on which to perform deduplication processing (see, for example, Patent Literatures 1 and 2). Patent Literature 1 discloses a method of performing chunking by using a small chunk size first, then detecting a largest sequence of repeated chunks contained in chunks created, and newly outputting chunks having a chunk size larger than an initial value. Moreover, Patent Literature 2 discloses a method of performing chunking on chunking-processing target data to be stored, by using a large chunk size for long stretches of duplicate data and long stretches of non-duplicate data and using a small size for data near the border between the duplicate data and the non-duplicate data.

CITATION LIST

Patent Literature

[PTL 1] Specification of US Patent Application Publication No. 2009/0313248
[PTL 2] Published Japanese Translation of PCT International Application No. 2010-515114

SUMMARY OF INVENTION

Technical Problem

Patent Literature 1 described above states that grouping sequential chunks within data into a single large chunk allows reduction in the number of disk accesses during data restoration without much lowering the deduplication rate, and consequently allows reduction in the amount of time required for data restoration. Moreover, Patent Literature 2 states that changing the chunk size according to the duplication or non-duplication of data allows accomplishment of high deduplication rate and fewer pieces of metadata.

However, the method in Patent Literature 1 includes processing for analyzing the chunk patterns of all the data, and the method in Patent Literature 2 includes processing for performing chunking while referring to history of past chunking. Generally, these types of processing are very time-consuming. The deduplication processing is often performed in parallel with periodical data backup processing, and is required to be completed within a backup window. Thus, in actual operation, it may be difficult to perform the chunking processing using the methods in Patent Literatures 1 and 2 every time the backup processing is executed.

The prevent invention has been made in consideration of the above problems, and has an objective of providing a stored data deduplication method, an information processing apparatus, and a deduplication program, which are capable of providing deduplication processing implementable in actual operation of a storage system and of reducing the amount of time required for data restoration of original data from data obtained by the deduplication processing.

Solution to Problem

An aspect of the present invention for achieving the above objective and other objectives is a stored-data deduplication method for eliminating a duplicate data fragment from a storage area in a storage device, the duplicate data fragment being a duplicate of one of data fragments constituting data stored in the storage device, the method comprising:
dividing the data to be stored in the storage device into the data fragments;
recording the data by using configurations of the divided data fragments;
judging whether identical data fragments exist in the data fragments;
when it is judged that the identical data fragments exist, storing one of the identical data fragments in the storage area of the storage device, and generating and recording data-fragment attribute information which is information indicating an attribute unique to the data fragment stored;
upon receipt of a request to read the data stored in the storage area of the storage device, acquiring the configurations of the data fragments forming the read-target data, reading the corresponding data fragments from the storage area of the storage device, and restoring the data;

acquiring and coupling the recorded data fragments to generate concatenation target data targeted for judgment on whether chunk concatenation is possible or not, and detecting whether the concatenation target data has a repeated data pattern which is repetition of a particular data pattern; and using as a concatenated data fragment a sequence of a plurality of the data fragments having the detected repeated data pattern, generating from the concatenated data fragment concatenated-data fragment attribute information indicating an attribute of the concatenated data fragment, and recording the concatenated-data fragment attribute information.

Further, another aspect of the present invention is a deduplication apparatus implementing the above deduplication method. Furthermore, yet another aspect of the present invention is a deduplication program for causing a computer to execute the above deduplication method.

Advantageous Effects of Invention

The present invention can provide a stored data deduplication method, an information processing apparatus, and a deduplication program which are capable of providing deduplication processing implementable in actual operation of a storage system and reducing the amount of time required for restoration of original data from data obtained by the deduplication processing.

BRIEF DESCRIPTION OF DRAWINGS

FIG. 3A is a diagram showing an example of a chunk management table 300 (216).

FIG. 3B is a diagram showing an example of the chunk management table 300 (216).

FIG. 4 is a diagram showing an example of data relocation on a storage device.

FIG. 5A is a diagram showing an example of a file management table 500 (215).

FIG. 5B is a diagram showing an example of the file management table 500 (215).

FIG. 6A is a diagram showing an example of a chunk pattern information table 600 (223) in a first embodiment.

FIG. 6B is a diagram showing an example of the chunk pattern information table 600 (223) in the first embodiment.

FIG. 7 is a diagram showing an example of a concatenated chunk information table 700 (224).

FIG. 14A is a diagram showing an example of a chunk management table 300 (216) in a second embodiment.

FIG. 14B is a diagram showing an example of the chunk management table 300 (216) in the second embodiment.

DESCRIPTION OF EMBODIMENTS

To accomplish the objective described above, the present invention divides processing into usual deduplication processing performed in every backup and data reanalysis processing performed for reduction in the amount of time required for data restoration. As a result of this, the usual deduplication processing required to be completed within a short period of time can be performed at a high speed, and the reanalysis processing can be performed when a certain amount of work time can be secured, such as during server maintenance.

The following problem arises when the data reanalysis processing described above is performed by any of the methods disclosed in Patent Literatures 1 and 2. Specifically, out of the three processes of deduplication described in Background Art, both of Patent Literatures 1 and 2 only disclose processing related to chunking. For this reason, even if chunking is performed by the method in Patent Literature 1 or 2 during the data reanalysis, a result of the chunking cannot be reflected in the usual deduplication processing by use of metadata. In addition, Patent Literatures 1 and 2 do not disclose a method for performing chunking on already-deduplicated data by using metadata. Thus, real data need to be reanalyzed.

To overcome these problems, metadata usable in the usual deduplication processing are created after data reanalysis is performed. Specifically, a group of chunks generated by the usual deduplication processing is analyzed, and chunks which can be concatenated without changing the deduplication rate are determined. Next, metadata to be used in the usual deduplication processing are created from the determined chunks, and are managed together with metadata on the chunks before concatenation. Thereby, deduplication judgment and data restoration using the metadata can be performed in the usual deduplication processing. Further, by performing analysis using the metadata on the chunks generated by the usual deduplication processing, chunks to be concatenated can be determined more efficiently than performing reanalysis of real data.

With reference to the drawings when necessary, modes for carrying out the present invention (called "embodiments" hereinbelow) are described.

First Embodiment

A first embodiment of the present invention is described below.

Figure 1:
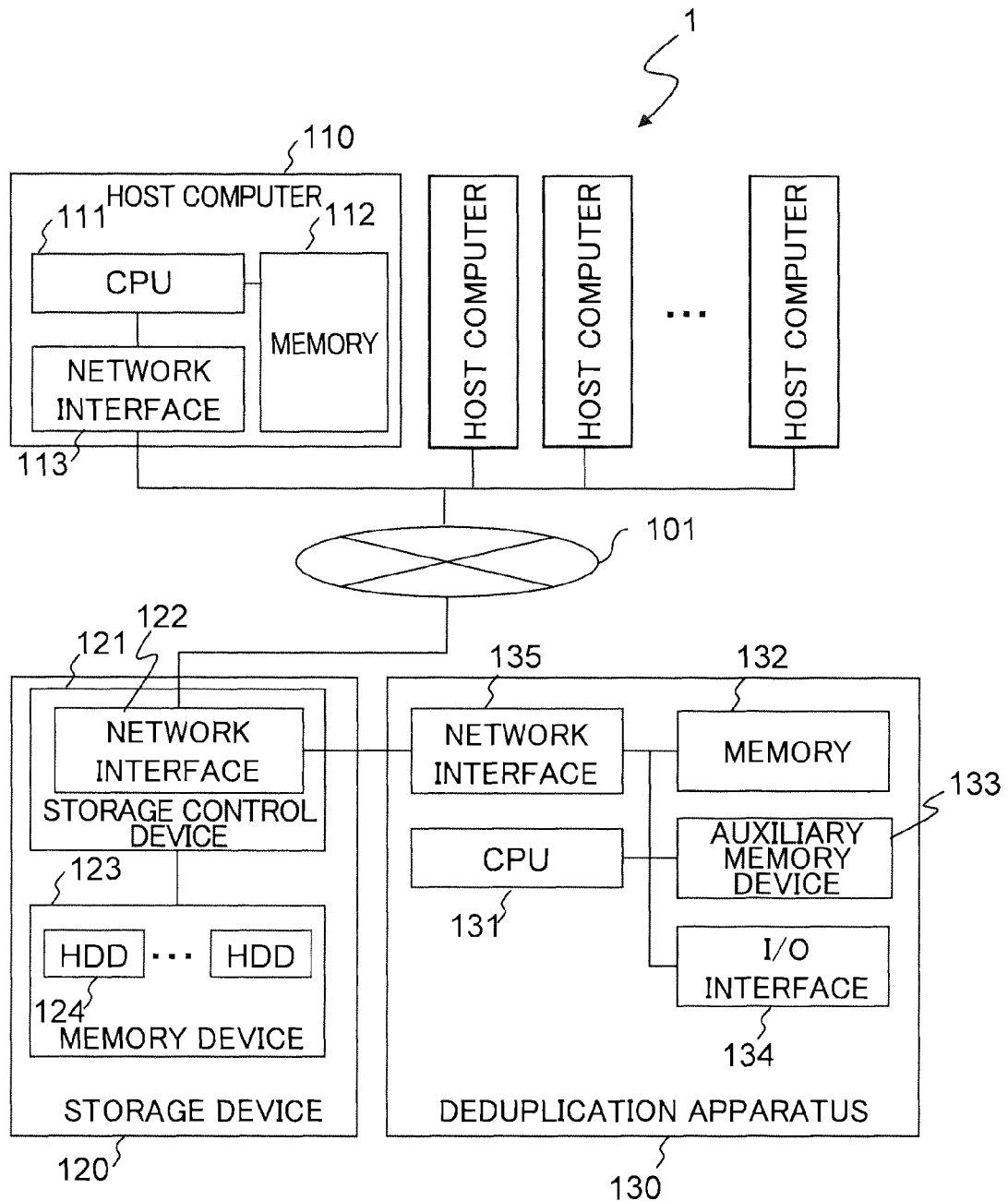
FIG. 1 is a diagram showing an example of a system configuration of a storage system 1 according to one embodiment of the present invention.

FIG. 1 is a diagram showing an example of a system configuration of a storage system 1 to which the first embodiment of the present invention is applied. As shown in FIG. 1, the system 1 includes a host computer 110, a storage device 120, and a deduplication device 130, and these devices are connected such that they can communicate one another via a network 101.

The host computer 110 is a typical computer at least including a CPU (Central Processing Unit) 111, a memory 112, and a network interface 113. The host computer 110 has a function to read data stored in the storage device 120 onto the memory 112 via the network interface 113 and a function to write the data on the memory 112 into the storage device 120 via the network interface 113. The host computer 110 may include an auxiliary memory device, such as a hard disk drive (HDD) or a solid state drive (SSD), in addition to the memory 112. The network interface 113 is selected according to the type of the network 101 to which the host computer 110 is connected. If, for example, the network 101 is a LAN (Local Area Network), an NIC (Network Interface Card) is provided as the network interface 113.

Although it is assumed below that data is made up of one or more files, data handled by the present invention are not limited to such a configuration. The present invention includes digital data in general represented as binary strings.

The storage device 120 includes at least a storage control device 121 and a memory device 123. The storage device 120 can employ a file storage method capable of data storage on a file basis, or other methods such as block storage. The storage control device 121 includes a network interface 122, and can read or write data from or into the memory device 123 in response to a data read/write command from the host computer 110 and the deduplication device 130. The memory device 123 is configured by a storage medium such as an HDD (Hard Disk Drive) 124, and configured to store therein data requested by a write command from the host computer 110 or the deduplication device 130. The storage control device 121 includes, although not shown, a processor such as a CPU, a memory, and a disk adapter as an I/O (Input/Output) interface between itself and the memory device 123. The storage control device 121 thus configured has capabilities such as a function to form a logical storage area in a physical storage area in the memory device 123 according to an appropriate RAID level and a function to create multiple logical volumes from the logical storage area and provide them to the host computer 110.

The deduplication device 130 includes at least a network interface 135, a CPU 131, a memory 132, an auxiliary memory device 133, an I/O interface 134, and an input/output device 136. The deduplication device 130 has a function to read data stored in the storage device 120 onto the memory 132 via the network interface 135 and a function to write the data on the memory 132 into the storage device 120 via the network interface 135. The I/O interface 134 is a data input device such as a keyboard and a mouse and a data output device such as a display and a printer, and is any of various devices with a data input/output function of a computer. Although the deduplication device 130 is configured as a computer separate from the storage device 120 in the example shown in FIG. 1, capabilities of the deduplication device 130 to be described later may be implemented inside the storage device 120.

Figure 2:
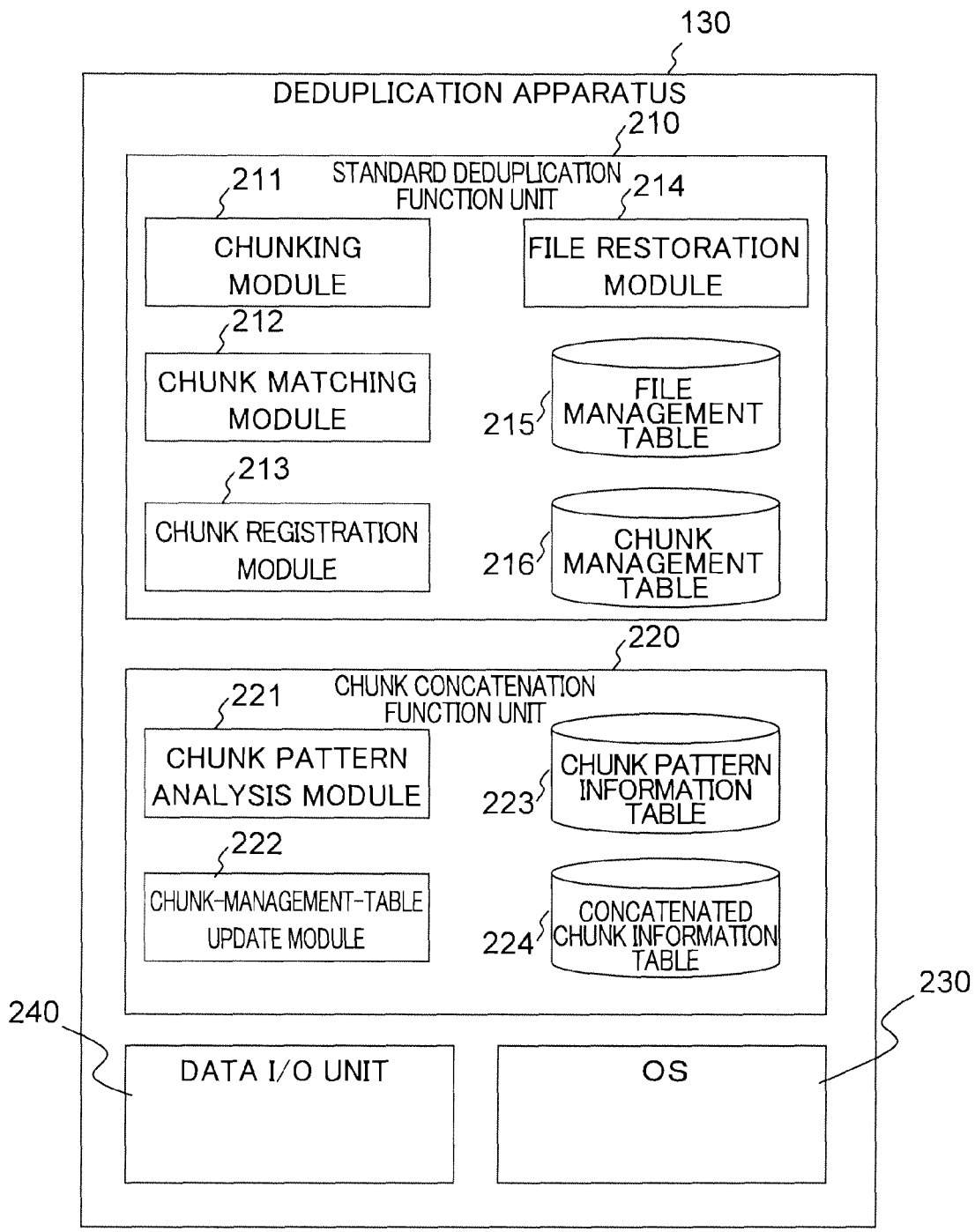
FIG. 2 is a diagram showing an example of a software configuration of a deduplication device 130.

Next, with reference to FIG. 2, examples of capabilities of the deduplication device 130 according to the first embodiment are described. Each of the capabilities of the deduplication device 130 is provided when the CPU 131 reads data and a program for implementing the function onto the memory 132 and executes the program, the data and program being stored in the auxiliary memory device 133.

The deduplication device 130 includes a standard deduplication function unit 210 and a chunk concatenation function unit 220. The standard deduplication function 210 provides a function to divide data to be stored in the storage device 120 into a sequence of multiple chunks (data fragments) and, store real data on only one of duplicate chunks (duplicate data fragments). This function of the standard deduplication function unit 210 can increase the available area in the memory device 123.

The chunk concatenation function unit 220 provides a function to analyze the sequence of chunks generated by the standard deduplication function unit 210 to find a repeatedly-appearing data pattern of chunks and manage the multiple chunks as a single concatenated chunk, so as to reduce costs required for data reconstruction. Means for implementing each of these capabilities is described specifically below.

The standard deduplication function unit 210 is configured by including at least a chunking module 211 (a data division part), a chunk matching module 212 (a data matching part), a chunk registration module 213 (a data registration part), a file restoration module 214 (a data restoration part), a chunk management table 216, and a file management table 215.

First, summaries of the above-mentioned units provided to the standard deduplication function unit 210 are described. The chunking module 211 has a function to read data stored in the storage device 120 and divide the data into multiple chunks. Details of processing performed by the chunking module 211 will be given later with reference to FIG. 8.

The chunk matching module 212 judges for each chunk generated by the chunking module 211 whether there is a duplicate chunk data thereof. Details of processing performed by the chunking module 211 will be given later with reference to FIG. 9.

The chunk registration module 213 has a function to generate attribute information on each chunk generated by the chunking module 211, and register the attribute information in the file management table 215 and the chunk management table 216, the attribute information being used for management of the chunk and containing a chunk ID 301, a hash value 302, and a chunk size 303. The chunk registration module 213 also has a function to store, in the storage device 120, real data for only a chunk judged by the chunk matching module 212 as not having duplicate data. Details of processing performed by the chunk registration module 213 will be given later with reference to FIG. 10.

The file restoration module 214 has a function to restore the data before being divided into the chunks by the chunking module 213, by using the attribute information stored in the file management table 215 and the chunk management table 216 and data for the chunks stored in the storage device 120. Details of a processing performed by the file restoration module 214 will be given later with reference to FIG. 11.

The chunk management table 216 retains the attribute information on each chunk generated by the chunking module 213 and is referred to when the chunk matching module 212 performs the duplicate-chunk judgment processing and when the file restoration module 214 restores data from the chunks. Details of the chunk management table 216 will be given later with reference to FIG. 3.

The file management table 215 retains information on a sequence of chunks constituting a file, and is referred to when a read target data (file) is to be restored in response to a data read command from the host computer 110. Details of the file management table 215 will be given later with reference to FIG. 4.

By the above-described capabilities of the standard deduplication function unit 210, original data written from the host computer 110 is converted into a group of non-duplicate chunks and attribute information on each chunk to be written, the attribute information being retained by the file management table 215 and the chunk management table 216. Herein, this series of processing is called "deduplication processing." In addition, the group of multiple non-duplicate chunks is called deduplicated data, and the attribute information one each chunk retained by the file management table 215 and the chunk management table 216 is called metadata. Original data can be restored from the deduplicated data and the metadata. Thus, after the deduplication processing is performed to store a single piece of real data on duplicated chunks, there is no need to retain the original data received from the host computer 110. For this reason, if there are multiple duplicate chunks, the size of data obtained by the deduplication processing is reduced compared to a case where the original data is stored without the deduplication processing.

Next, a description is given of the chunk concatenation function unit 220. The chunk concatenation function unit 220 is configured by including at least a chunk pattern analysis module 221 (a data analysis part), a chunk-management-table update module 222 (a data update part), a chunk pattern information table 223, and a concatenated chunk information table 224.

The chunk pattern analysis module 221 has a function to analyze a sequence of chunks of each file managed by the file management table 215 and determine chunks to be concatenated to reduce reconstruction costs. Details of processing performed by the chunk pattern analysis module 221 will be given later with reference to FIG. 12.

The chunk-management-table update module 222 has a function to relocate data stored in the storage device 120 according to the chunks to be concatenated determined by the chunk pattern analysis module 221, and update information retained by the file management table 215 and the chunk management table 216 according to a result of the data relocation. Details of processing performed by the chunk-management-table update module 222 will be given later with reference to FIG. 13.

The chunk pattern information table 223 retains information used by the chunk pattern analysis module 221 to determine chunks to be concatenated. Details of a configuration of the chunk pattern information table 223 will be given with reference to FIG. 6.

The concatenated chunk information table 224 retains information on chunks determined by the chunk pattern analysis module 221 as chunks to be concatenated. Details of a configuration of the concatenated chunk information table 224 will be given later with reference to FIG. 7.

The deduplication device 130 has an operating system (OS) 230 and a data I/O unit 240 installed therein. The OS 230 is basic software having basic data processing capabilities as a computer of the deduplication device 130, and an OS usable for a general computer can be employed appropriately. Controlled by the OS 230, the data I/O unit 240 manages each module of the standard deduplication function unit 210 or the chunk concatenation function unit 220 and data I/O processing performed with the outside via the network interface 135.

Next, with reference to FIGS. 3A and 3B, a description is given of an example of the chunk management table 216 according to the first embodiment. Note that, in the following descriptions of the tables, each table is denoted by a reference numeral different from that used in FIG. 2 so that reference numerals given to items of the table are easy to follow. For example, the chunk management table 216 is referred to as a chunk management table 300 when described solely, and shown as a "chunk management table 300 (216)" when necessary. FIG. 3A shows an example of how the file management table 215 looks after the standard deduplication function unit 210 of the deduplication device 130 performs the data deduplication processing. FIG. 3B shows how the chunk management table 216 looks after the chunk concatenation function unit 220 of the deduplication device 130 concatenates chunks identified by the chunk IDs 1, 2, and 3 to generate a chunk having the chunk ID 301 of 9, and registers the chunk in the chunk management table 216. A description of the chunk concatenation processing will be given later.

The chunk management table 300 exemplified in FIGS. 3A and 3B contains the following items: the chunk ID 301, the hash value 302, the chunk size 303, a number of duplications 304, and a storage location 306. The chunk ID 301 is an ID for uniquely identifying each chunk, and is allocated by the chunk registration module 213 to a new chunk when the chunk registration module 213 adds attribute information on the chunk to the chunk management table 216, such that the chunk ID 301 of the new chunk may not be the same as the chunk IDs 301 of any other chunks. As the hash value 302, an output value obtained by inputting data contained in each chunk to a hash function is stored. As the hash function, SHA-1, for example, can be used. Note that the hash value 302 calculated for each chunk may be used as the chunk ID 301. In that case, if the hash values 302 for different chunks return as the same value, identifiers are added for discriminating the chunks with the same hash value 302 from one another. The chunk size 303 indicates the data size of each chunk, and is expressed in terms of kilobytes in the example in FIGS. 3A and 3B. The number of duplications 304 indicates how many times a chunk identified by the corresponding chunk ID 301 or hash value 302 appears in data on which the deduplication processing has not been performed. The storage location 305 indicates a location on the memory device 123 where the chunk identified by the corresponding chunk ID 301 or hash value 302 is stored. For example, the location is recorded as a block address or the like on the logical storage area provided by the memory device 123. The storage location 305 is used when the deduplication device 130 acquires chunk data on the memory device 123. The file restoration module 214 can read chunks constituting a read target file, by referring to the storage location 305 and the chunk size 303 retained by the chunk management table 300.

Next, with reference to FIG. 4, a description is given of relocation of data on the memory device 123 performed in the chunk concatenation processing. FIG. 4(*a*) shows an example of chunks stored in the memory device 123 before they are relocated by the chunk concatenation function unit 220. In the example in FIG. 4(*a*), chunks having the chunk ID 301 of 1, 2, and 3 are stored at inconsecutive locations indicated by the storage location 305 of L_1, L_2, and L_3, respectively. In contrast, FIG. 4(*b*) shows an example of a state after the chunk concatenation function unit 220 concatenates the chunks specified by the chunk ID 301 of 1, 2, and 3 to generate a chunk having the chunk ID 301 of 9 and relocates the chunks on the disk. In FIG. 4(*b*), the original three chunks are stored at consecutive locations as the new chunk identified by the chunk ID 301 of 9. By such data placement in the logical storage area of the memory device 123, when the chunk identified by the chunk ID 301 of 9 is to be acquired, the number of accesses to the memory device 123 made by the deduplication device 130 is reduced to one from three which would have been the case if the data relocation were not performed.

Next, with reference to FIGS. 5A and 5B, a description is given of the file management table 500 (215). FIGS. 5A and 5B each show an example of a configuration of the file management table 500, FIG. 5A exemplifying a state before the chunk concatenation processing, FIG. 5B exemplifying a state after the chunk concatenation processing. The file management table 500 contains the following items: a file name 501, a file size 502, a number of chunks 503, and a constituting-chunks ID 505. The file name 501 indicates an identifier uniquely identifying each file. The file size 502 indicates the size of each file in terms of, for example, kilobytes. The number of chunks 503 indicates the number of chunks constituting the file. The constituting-chunks ID 505 indicates a sequence of the chunk IDs 301 of chunks constituting the file. Upon receipt of a file read command from the host computer 110, the deduplication device 130 can restore a read target file from chunks stored in the memory device 123 by acquiring the file name 501 of the read target file recorded in the file management table 500 and the constituting-chunks ID 505 recorded in association therewith. In the example in FIG. 5A, a file identified by the file name 501 of "sample1.txt" is constituted by ten chunks recorded in the constituting-chunks ID 505. As they are recorded in the constituting-chunks ID 505, the IDs of the chunks are "1-2-3-4-1-2-3-5-6-1," and the chunks are arranged in this order. On the other hand, in FIG. 5B showing a state after the chunk concatenation processing, a file having the file name 501 of "sample1.txt" is constituted by six chunks. This is because, as shown in FIG. 3B, the new chunk constituted by the chunk IDs 301 "1-2-3" is defined as a chunk having the chunk ID 301 of 9. Thus, in FIG. 5B, a sequence of the IDs of the chunks constituting the file name "sample1.txt" is "9-4-9-5-6-1."

Next, with reference to FIGS. 6A and 6B, a description is given of a chunk pattern information table 600 (223). FIG. 6A shows an example of a configuration of the chunk pattern information table 600 after processing for detecting a repeated pattern of chunks to be described later is performed, and FIG. 6B shows an example of a configuration of the chunk pattern information table 600 after a pattern having the same chunks is divided. The chunk pattern information table 223 contains the following items: a chunk pattern 601, a length 602, a number of appearances 603, and an appearance location 604. The chunk pattern 601 indicates, as a sequence of the chunk IDs 301, a pattern repeatedly appearing in a chunk sequence stored in the logical storage area provided by the memory device 123. The length 602 indicates the number of chunks constituting the chunk pattern 601. The number of appearances 603 indicates how many times the chunk pattern 601 appears in the chunk sequence. The appearance location 604 indicates at which locations in the digital data sequence stored in the logical storage area provided by the memory device 123 the chunk pattern 601 appears, by use of a block address or the like in the logical storage space. For example, FIG. 6A shows that the chunk pattern 601 indicated by the chunk IDs 301 of 1-2-3 appears at the first location, the 100-th location, and the 212-th location from the head of the digital data sequence. The chunk pattern analysis module 221 dynamically updates the chunk pattern information table 223 to determine chunks to be concatenated. Details of chunk pattern analysis processing performed by the chunk pattern analysis module 221 will be given later with reference to FIG. 12.

Next, with reference to FIG. 7, a description is given of a concatenated chunk information table 700 (224). FIG. 7 shows an example of a configuration of the concatenated chunk information table 700. The concatenated chunk information table 700 contains the following items: a concatenated chunk ID 701, a sub-chunks ID 702, a number of appearances 703, and an update date 704. The concatenated chunk ID 701 is the chunk ID 301 newly allocated by the chunk pattern analysis module 221 to the chunk pattern 601 determined by the chunk pattern analysis module 221 as chunks to be concatenated. The sub-chunks ID 702 indicates the chunk IDs 301 indicating smaller chunks constituting the concatenated chunk (which are called sub-chunks hereinbelow). The number of appearances 703 indicates how many times the concatenated chunk appears in the chunk sequence on the logical storage area of the memory device 123. In the example in FIG. 7, sub-chunks 1-2-3 are concatenated to generate a concatenated chunk which is allocated 9 as a new chunk ID 301. The update date 704 indicates the date of the chunk pattern analysis module 221 registering the concatenated chunk.

Figure 8:
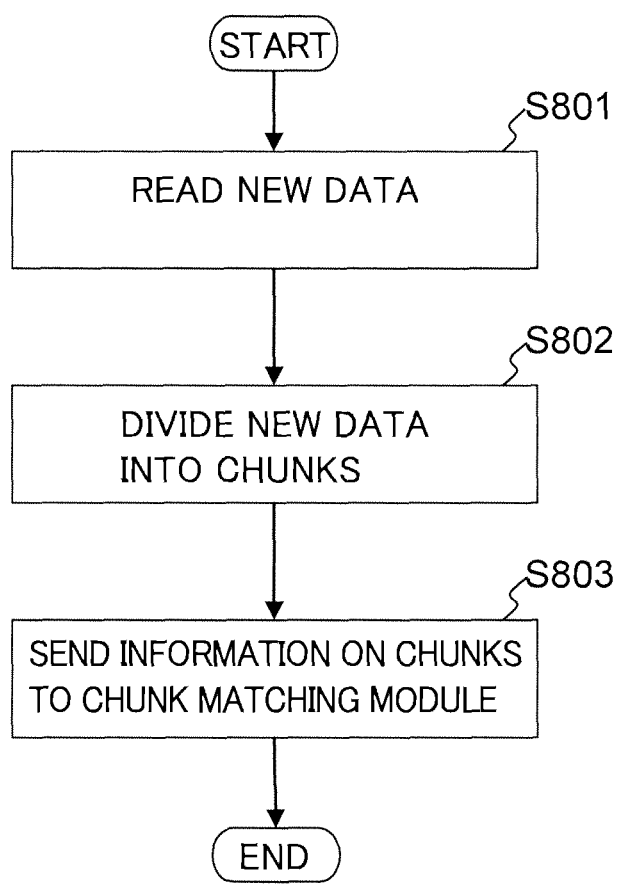
FIG. 8 is a diagram showing an example of a flow of processing performed by a chunking module 211.

Next, with reference to FIG. 8, a flow of processing performed by the chunking module 211 is described. FIG. 8 shows an example of a data processing flow executed by the chunking module 211.

A series of deduplication processing by the standard deduplication function unit 210 of the deduplication device 130 is started when the chunking module 211 starts performing processing. There are roughly two methods to determine the timing to start the deduplication processing. In one of the methods, the deduplication processing is performed when the host computer 110 transmits data to the storage device 120. In this case, before the storage control device 121 writes the data into the memory device 123, the deduplication device 130 receives the data via the network interface 135, performs the deduplication processing thereon, and then writes data divided into chunks into the memory device 123. This first method is called an inline method. In a second method, the deduplication processing is performed after the storage control device 121 writes data transmitted by the host computer 110 to the storage device 120 into the memory device 123. In this case, after reading data on the memory device 123 and performing the deduplication processing thereon, the deduplication device 130 writes the data on which the deduplication processing has performed into the memory device 123 again. This second method is called a post-processing method. In the post-processing method, the deduplication processing by the deduplication device 130 is started, for example, at a set time every week in time with the timing of backup processing on data stored in the memory device 123. Although the post-processing method is employed in the following for convenience of description, the present invention can be applied to the inline method only by changing the timing to start the deduplication processing and a source from which the deduplication device 130 reads data.

Referring back to FIG. 8, in S801 (reference sign S denotes "Step" and the same applies hereinbelow), the chunking module 211 reads new data. Here, the new data refers to data on which the standard deduplication function unit 210 has not performed the deduplication yet, among data stored in the storage device 120. For example, the storage device 120 can perform identification of new data based on information indicating whether or not the deduplication processing has been executed on the data or not, the information being recorded in a bitmap of each address in the logical storage area of the memory device 123, or recorded for each file received. The chunking module 211 proceeds to processing in S802 after reading the new data.

In S802, the chunking module 211 divides the data read in S801 into chunks. As a chunk division method, there are roughly a fixed-length method which divides data according to a fixed data size such as 1 KB, and a variable-length method which uses, as a division position, a particular byte pattern appearing in a digital data sequence.

Chunking of the fixed-length method is described in, for example, the following literature:

S. Quinlan and S. Dorward, "Venti: a new method to archival storage," The First USENIX conference on File and Storage Technologies (Fast '02), January 2002.

Chunking of the variable-length method is described in, for example, the following literatures:

A. Muthitacharoen, B. Chen, and D. Mazieres, "A low-bandwidth network file system," The 18th ACM Symposium on Operating Systems Principles (SOSP), Banff, Alberta, Canada, October 2001.

B. Zhu, K. Li, and H. Patterson, "Avoiding the disk bottleneck in the Data Domain deduplication file system," The 6th USENIX Conference on File and Storage Technologies (FAST '08), February 2008.

As exemplified in FIG. 4, in the chunking performed in this embodiment, the chunk size 303 of each chunk is different, i.e., the variable-length method is employed. Nonetheless, the present invention is applicable no matter what division method is employed. The chunking module 211 proceeds to processing in S803 after determining the chunk division positions according to an appropriate division method.

In S803, the chunking module 211 sends the chunk matching module 212 information on the chunks determined in S802. The chunking module 211 includes, in this chunk information, the new data and information indicating the chunk division positions, such as addresses.

Figure 9:
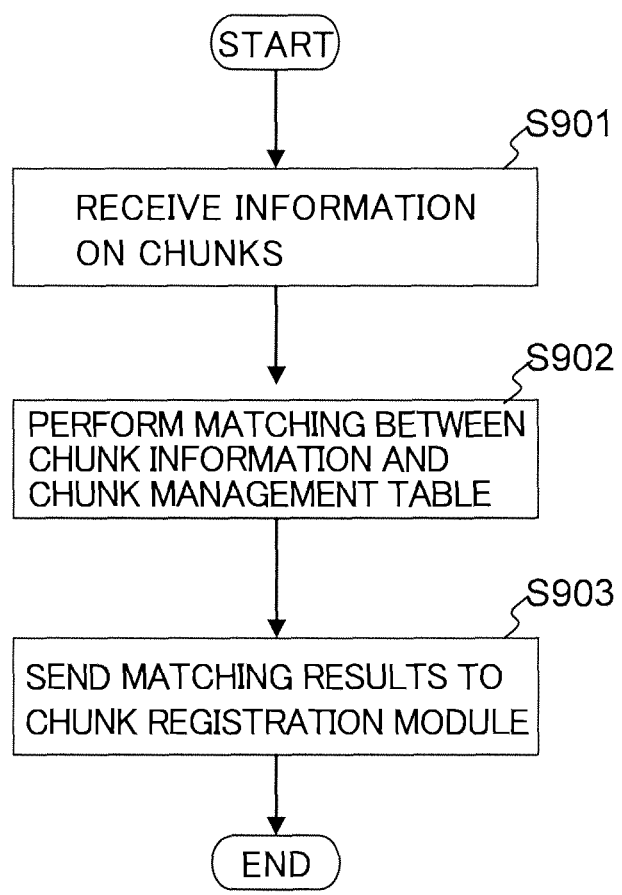
FIG. 9 is a diagram showing an example of a flow of processing performed by a chunk matching module 212.

Next, with reference to FIG. 9, a flow of processing performed by the chunk matching module 212 is described. FIG. 9 is an example of a data processing flow executed by the chunk matching module 212 of this embodiment.

First, in S901, the chunk matching module 212 receives the chunk information sent from the chunking module 211. The chunk matching module 212 proceeds to Step S902 after receiving the chunk information.

In S902, the chunk matching module 212 checks for each of the chunks determined in S802 whether the chunk is already in the chunk management table 300 or not. For example, this check is performed as follows. First, the chunk matching module 212 calculates a hash value of each received chunk by using the same hash function as that used to obtain the hash value 302 recorded in the chunk management table 300 for the chunk. Next, the chunk matching module 212 checks whether there is a chunk with the same hash value in the chunk management table 300 or not by performing matching between the hash value calculated and the hash value 302 of each chunk recorded in the chunk management table 300. This chunk matching processing may be performed using a bloom filter, as described in the following literature:

B. Zhu, K. Li, and H. Patterson, "Avoiding the disk bottleneck in the Data Domain deduplication file system," The 6th USENIX Conference on File and Storage Technologies (FAST '08), February 2008.

By use of an ideal hash function, it is next to impossible for different chunks to have the same hash value (hash collision). Thus, the identicalness between chunks can be judged based on the identicalness between hash values calculated from them. If the possibility of hash collision is taken into consideration for better accuracy in the chunk matching processing, chunks judged as having the same hash value are directly compared on their binary data stored in the memory device 123, so that the identicalness can be accurately judged. The chunk matching module 212 proceeds to processing in S903 after checking for each received chunk whether it is in the chunk management table 216 or not as described above.

In S903, the chunk matching module 212 sends the chunk registration module 213 results of the matching in S902 and ends the processing.

Figure 10:
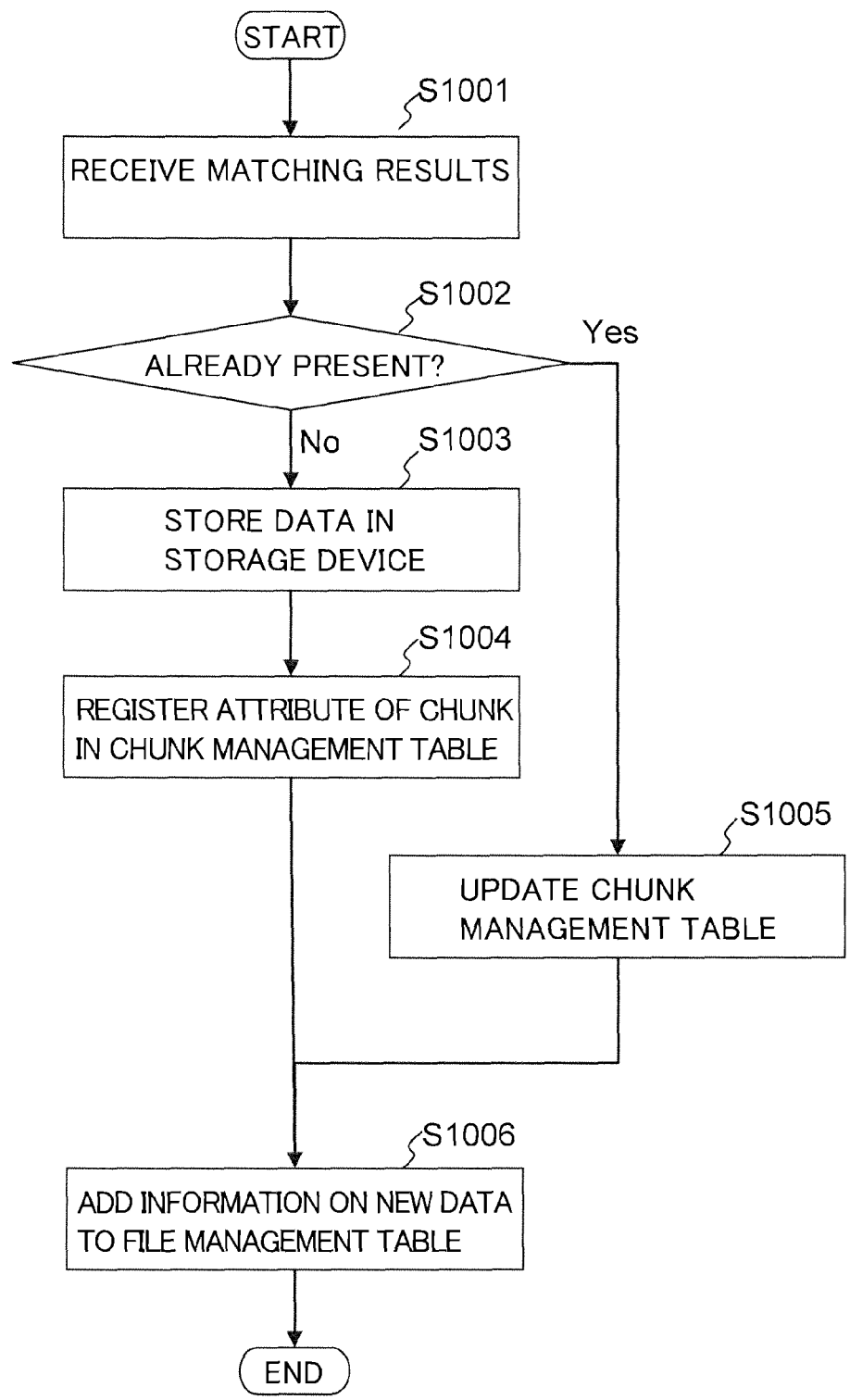
FIG. 10 is a diagram showing an example of a flow of processing performed by a chunk registration module 213.

Next, with reference to FIG. 10, a flow of processing performed by the chunk registration module 213 is described. FIG. 10 shows an example of a data processing flow executed by the chunk registration module 213.

In S1001, the chunk registration module 213 receives the matching results sent from the chunk matching module in S903. Each matching result contains information on whether the same chunk as the received chunk is already stored in the chunk management table 300 or not. The chunk registration module 213 performs S1002 and following steps on each chunk after receiving the matching result for the chunk.

In S1002, the chunk registration module 213 judges whether a target chunk is in the chunk management table 300. This judgment is performed based on the check result obtained by the chunk matching module 212 in S902. If the target chunk is in the chunk management table 216, it means that the same chunk is already in the memory device 123. Thus, the target chunk is called a duplicate chunk. The chunk registration module 213 proceeds to processing in S1005 when determining that the target chunk is a duplicate chunk (S1002, Yes). The chunk registration module 213 proceeds to processing in S1003 when determining that the target chunk is not a duplicate chunk (S1002, No).

In S1003, the chunk registration module 213 stores data on the target chunk in the memory device 123. Instead of saving the target chunk in the memory device 123, the following method may be employed. Specifically, the target chunk is temporarily stored in the memory 132 and then collectively stored in the memory device 123 together with other non-duplicate chunks. The chunk registration module 213 proceeds to processing in S1004 after saving the target chunk in the memory device 123 or the memory 132.

In S1004, the chunk registration module 213 registers attribute information on the target chunk in the chunk management table 300. As the chunk ID 301, the chunk registration module 213 allocates a value or symbol which is not the same as any of the existing chunk IDs 301. As the hash value 302, the value calculated in S902 is registered. As the chunk size 303, a calculated size of the target chunk is registered. As the number of duplications 304, a numerical value 1 is registered since there is no duplicate chunk. As the storage location 305, information on the location of the chunk stored in S1003 is registered. The chunk registration module 213 proceeds to S1006 after registering the attribute information on each chunk in the chunk management table 300 as above.

On the other hand, in S1005, the chunk registration module 213 updates the attribute information on the duplicate chunk of the target chunk, which is already registered in the chunk management table 300. In this case, the chunk registration module 213 increments by one the value of the number of duplications 304 registered for that chunk. The chunk registration module 213 proceeds to processing in S1006 after updating the attribute information in the chunk management table 300.

In S1006, the chunk registration module 213 adds information on the processed new data (new file) to the file management table 500. Specifically, in the file management table 500, the chunk registration module 213 registers the file name 501, the file size 502, the number of chunks 503, and the constituting-chunks ID 505 for each file contained in the new data.

Figure 11:
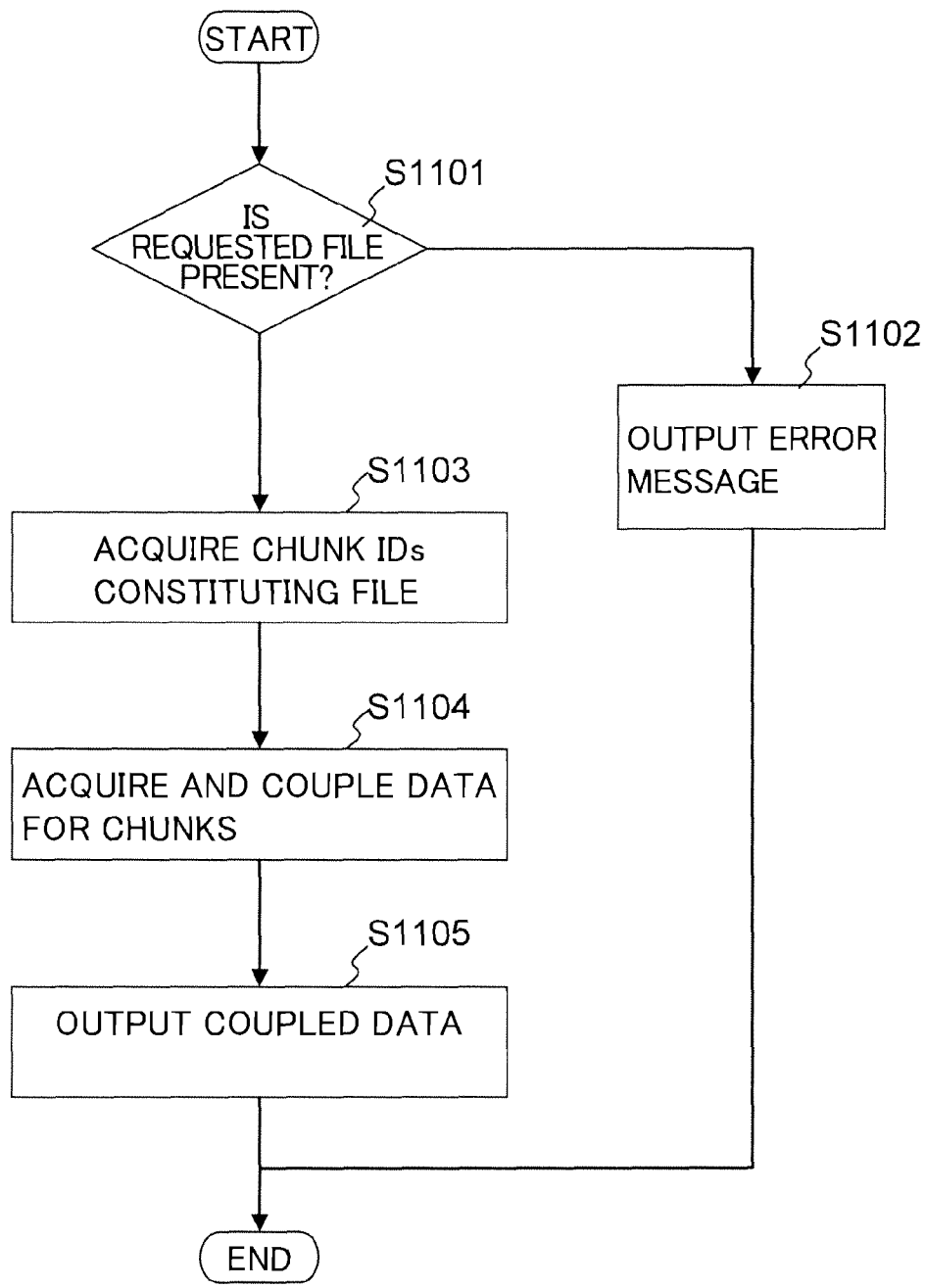
FIG. 11 is a diagram showing an example of a flow of processing performed by a file restoration module 214.

Next, with reference to FIG. 11, a flow of processing performed by the file restoration module 214 is described.

FIG. 11 shows an example of a data processing flow executed by the file restoration module 214 of this embodiment.

The file restoration module 214 starts processing when the standard deduplication function unit 210 of the deduplication device 130 receives, via the network interface 135, a data read command sent from the host computer 110 to the storage device 120. Deduplicated data stored in the memory device 123 are not the same as the original data. Thus, upon receipt of the data read command, the deduplication device 130 needs to restore the original data (file) from the deduplicated data. Herein, this processing is called data restoration. The data restoration is performed on entire or part of data stored in the memory device 123. The following describes processing for restoring a single file. However, also in a case of general data, the data is divided into multiple files, the chunking is performed on each of the files, and the data can be restored by performing similar processing on each divided file.

First, in S1101, the file restoration module 214 searches the file management table 500 based on the file name 501 of a restoration target file contained in the data read command. When it is determined that a file with the file name of the restoration target is recorded in the file management table 500 (S1101, Yes), the file restoration module 214 acquires the constituting chunks ID 505 of that file in S1103 and proceeds to processing in S1104. When it is determined that there is no entry of the file with the requested file name 501 in the file management table 500 (S1101, No), the file restoration module 214 for example outputs an error message in S1102, and ends the processing.

On the other hand, in S1104, the file restoration module 214 acquires data for the chunks constituting the file from the memory device 123. Specifically, the following processing is performed on each chunk ID 301 contained in the constituting-chunks ID 505 acquired in S1103. First, the file restoration module 214 searches the chunk management table 300 based on the chunk ID 301, and acquires the storage location 305 corresponding to the chunk. Next, based on the storage location 305 acquired, the file restoration module 214 acquires data for the chunk. The data for the chunk acquired is temporarily stored in the memory 132. After the above processing is performed on all the chunk IDs 301 contained in the constituting chunks ID 505, the data for the chunks are coupled in the order of their IDs in the constituting chunks ID 505. Then, the file restoration module 214 proceeds to S1105.

In S1105, the file restoration module 214 sends the data coupled in S1104 to the host computer 110 via the network interface 135, and ends the processing.

Figure 12:
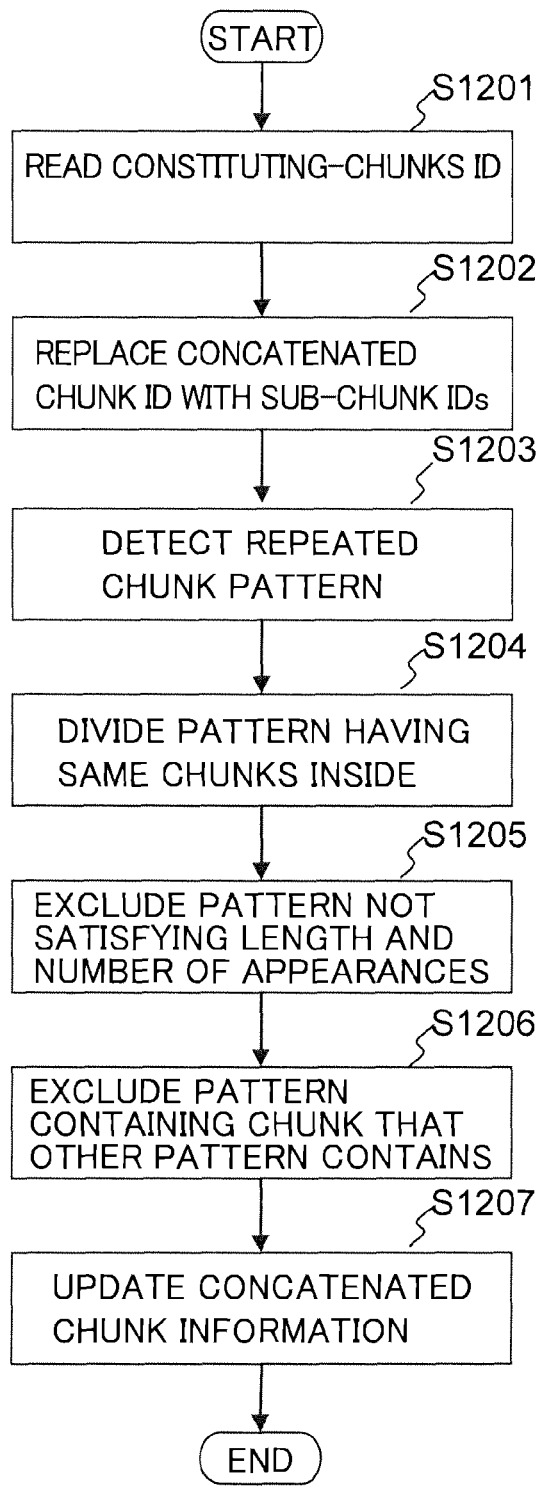
FIG. 12 is a diagram showing an example of a flow of processing performed by a chunk pattern analysis module 221.

Next, with reference to FIG. 12, a flow of processing performed by the chunk pattern analysis module 221 is described. FIG. 12 shows an example of a data processing flow executed by the chunk pattern analysis module 221 of this embodiment. The chunk pattern analysis module 221 can be configured to start its processing periodically, such as once a week, by a timer activated by the OS 230 of the deduplication device 130, or manually by an administrator.

First, in S1201, the chunk pattern analysis module 221 reads the constituting-chunks ID 505 contained in the file management table 500. In this reading, the chunk pattern analysis module 221 may target all of the files included in the file management table 500 or may target some of them. After reading the constituting-chunks ID 505, the chunk pattern analysis module 221 proceeds to processing in S1202.

In S1202, among the chunk IDs 301 contained in the constituting chunks ID 505 read in S1201, the chunk pattern analysis module 221 replaces the chunk ID 301 of a concatenated chunk with sub-chunk IDs. In this processing, the chunk pattern analysis module 221 refers to the concatenated chunk information table 700 and checks whether the chunk ID 301 read is registered in the concatenated chunk ID 701. For example, if the chunk IDs 301 read in S1201 contains "9," the chunk pattern analysis module 221 refers to the concatenated chunk information table 700, replaces "9" with sub-chunk IDs "1-2-3," and proceeds to processing in S1203.

Next, in S1203, the chunk pattern analysis module 221 creates the chunk pattern information table 600 shown in FIG. 6A. This is achieved by the following processing. First, the chunk pattern analysis module 221 couples together a group of the constituting chunks ID 505 after the replacement by the sub-chunk IDs in S1202 and thereby forms a single string. In coupling the constituting chunks ID 505, at the position of a file break between the constituting-chunks IDs 505, the chunk pattern analysis module 221 inserts an identifier indicating a file break. A value allocated as this identifier is different from any of the chunk IDs 301 or identifiers indicating other file breaks. For example, in a case of coupling the constituting chunks ID 505 "1-2-3-4-1-2-3-5-6-1," "7-8-4-2-5," and "3-2" constituting three files, respectively, the chunk pattern analysis module 221 inserts identifiers $ and ¥ to the positions of file breaks to make them "1-2-3-4-1-2-3-5-6-1-$-7-8-4-2-5-¥-3-2." In this way, a string including the chunk IDs 301 and the file-break identifiers is generated.

Next, the chunk pattern analysis module 221 searches the generated string for substrings which coincide with each other but have different characters before and after them. Such a string is defined as a "repeated pattern" herein. For instance, from the string "1-2-3-4-1-2-3-5-6-1-$-7-8-4-2-5-¥-3-2" above, "1-2-3" is extracted as the repeated pattern. Although a substring "1-2" appears twice in the above string, they both have 3 following them and are therefore not a repeated pattern. It is known that such operation on strings can be efficiently performed using a data structure called "Suffix Tree" or "Suffix Array." Details of search for the repeated patterns are given in, for example, the following literature:

Gusfield, Dan (1999) [1997]. Algorithms on Strings, Trees and Sequences: Computer Science and Computational Biology. USA: Cambridge University Press. p. 143.

In this way, the chunk pattern analysis module 221 searches for all the repeated patterns in the substring-search-target string obtained by coupling the constituting chunks IDs 505. Further, the chunk pattern analysis module 221 acquires the length 602, the number of appearances 603, and the appearance location 604 of each repeated pattern and registers them in the chunk pattern information table 600. This is the processing for creating the chunk pattern information table 600. Although the repeated pattern search is executed for all the read constituting-chunks IDs 505 in the above processing, similar processing may be performed only on duplicate chunks to achieve reduction in memory necessary for the search and improvement in the search speed. Judgment on whether or not the chunk is a duplicate chunk can be performed by checking whether the number of duplications 503 in the chunk management table 500 associated with the corresponding chunk ID is 2 or larger. The chunk pattern analysis module 221 proceeds to processing in S1204 after creating the chunk pattern information table 223.

In S1204, among the chunk patterns in the chunk pattern information table 223, the chunk pattern analysis module 221 divides one having the same chunks inside into multiple chunk patterns. For instance, "1-2-3-1-5-6" which is the third chunk pattern from the top in FIG. 6A has the same chunks "1" inside. Thus, as shown in the upper table in FIG. 6B, this chunk pattern is divided into "1-2-3" and "1-5-6" each not having the same chunk inside. Generally, this division is, although not uniquely, performed such that chunks after the division are as large as possible. This division might result in generation of the same chunk patterns 601 in the chunk pattern information table 223. In this case, the same chunk patterns 601 are grouped into one entry. In this event, the number of appearances 603 is replaced by the sum of the number of appearances 603 of the same chunk patterns 601, and the appearance position 604 is replaced with a joint of the appearance positions 604 of the same chunk patterns 601. For instance, in the upper table in FIG. 6B, two chunk patterns "1-2-3" exist. Thus, as shown in the lower table in FIG. 6B, they can be grouped into one entry. The chunk pattern analysis module 221 proceeds to processing in S1205 after dividing the chunk pattern having the same chunks inside.

Next, in S1205, from the chunk pattern information table 600, the chunk pattern analysis module 221 excludes chunk patterns not meeting policies for the chunk pattern 601. The policies for chunk pattern includes a minimum length, a minimum number of appearances, and the like of the chunk pattern 601, and these values are preset by an administrator or the like in a parameter storage area prepared in the chunk concatenation function unit 220. Generally, the larger the length 602 of the chunk pattern 601 and the larger the number of appearances 603 of the chunk pattern 601, the higher the efficiency of chunk concatenation. Thus, setting the minimum value for the length 602 of the chunk pattern and the minimum number of appearances 603 of the chunk pattern as policies allows a configuration where a concatenated chunk is generated only when a high effect will be brought by the chunk concatenation. In addition, the maximum value for the length 602 of the chunk pattern 601, the maximum number of appearances 603 of the chunk pattern 601, and the like may be set as the policies. The chunk pattern analysis module 221 proceeds to processing in S1206 after excluding an entry of the chunk pattern 601 from the chunk pattern information table 600 according to the policies set above.

In S1206, the chunk pattern analysis module 221 excludes the chunk pattern 601 containing the same chunk as a chunk contained in the other chunk pattern 601. This processing is performed to further improve the deduplication efficiency by not storing duplicate chunks contained in different concatenated chunks. For example, in the lower table in FIG. 6B, the chunk patterns "1-2-3" and "1-5-6" include the same chunk "1." Thus, either one of these is excluded from the chunk pattern information table 600. Which one of the chunk patterns to exclude can be determined according to a preset rule. For example, this rule may be such that "exclude one with smaller number of appearances 603" or "exclude one with smaller length 602." The chunk pattern analysis module 221 proceeds to processing in S1207 after excluding an entry of one of the chunk patterns 601 containing the same chunk from the chunk pattern information table 600.

In S1207, the chunk pattern analysis module 221 updates the concatenated chunk information table 700. The chunk pattern analysis module 221 determines, as chunks to be concatenated, the chunk patterns 601 contained in the chunk pattern information table 600 after the execution of the processing in S1206, and newly registers information on each chunk pattern 601 in the concatenated chunk information table 700. In this regard, the chunk pattern analysis module 221 allocates a new chunk ID 301 to each chunk pattern 601 and registers it in the concatenated chunk ID 701. Further, for each concatenated chunk ID 701, the chunk pattern analysis module 221 registers the chunk IDs 301 constituting the chunk pattern identified by the concatenated chunk ID 701 in the sub-chunks ID 702, registers the number of appearances of the chunk pattern in the number of appearances 703, and registers the date of newly registering the concatenated chunk ID 701 in the update date 704.

The chunk pattern analysis processing described above allows chunks generated by dividing stored data in the storage device 120 to be reconstructed as a longer concatenated chunk. Hence, the storage efficiency of the storage device 120 can be improved, and also, the speed of reading data from the storage device 120 can be improved.

Figure 13:
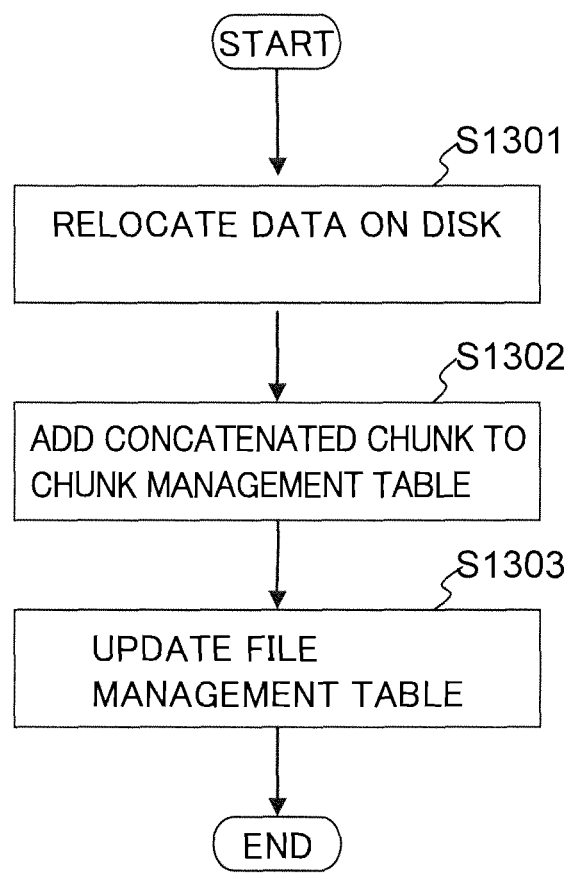
FIG. 13 is a diagram showing an example of a flow of processing performed by a chunk-management-table update module 222.

Next, with reference to FIG. 13, a description is given of a flow of processing performed by the chunk-management-table update module 222. FIG. 13 shows an example of a data processing flow executed by the chunk-management-table update module 222. The chunk-management-table update module 222 can start processing immediately after or sometime after the chunk pattern analysis module 221 finishes its processing.

In S1301, the chunk-management-table update module 222 performs relocation of the data on the memory device 123. This processing is implemented by the following processing performed on each entry of the concatenated chunk ID 701 contained in the concatenated chunk information table 700. First, the chunk-management-table update module 222 refers to the chunk management table 300 to acquire the data storage location 305 of each sub-chunk contained in the concatenated chunk. Next, the chunk-management-table update module 222 acquires data for each sub-chunk from the memory device 123, couples the data for the sub-chunks together, and stores the coupled data temporarily in the memory 132. Next, the chunk-management-table update module 222 writes the coupled sub-chunk data into the memory device 123 as a new chunk. In this event, the chunk-management-table update module 222 retains inside a location where the data has been written. Finally, the chunk-management-table update module 222 deletes the original sub-chunk data on the memory device 123. The chunk-management-table update module 222 proceeds to processing in S1302 after performing the above data relocation processing.

In S1302, the chunk-management-table update module 222 adds attribute information on the concatenated chunk to the chunk management table 300. As an example, FIG. 4B shows a state after the concatenated chunk "9" is newly added to the chunk management table 300. Registered as the hash value 302 is a value calculated by applying a predetermined hash function to the concatenated chunk data registered. Registered as the chunk size 303 is a value of the number of appearances 703 in the concatenated chunk information table 700. Registered as the storage location 305 is the location on the memory device 123 where the concatenated chunk data has been written in S1301. After adding the concatenated chunk, the chunk-management-table update module 222 changes the storage location 305 of each sub-chunk contained in the concatenated chunk. The storage location 305 of each sub-chunk can be determined based on the storage location 305 of the concatenated chunk, the order of the sub-chunks in the concatenated chunk, and the sizes of the sub-chunks constituting the concatenated chunk. For instance, the chunk "3" can be designated by a location ahead of the storage location 305 of the chunk "9" by a distance corresponding to the sum of the lengths of the data for the chunks "1" and "2." The chunk-management-table update module 222 proceeds to processing in S1303 after updating the chunk management table 300.

Next, in S1303, the chunk-management-table update module 222 replaces the constituting-chunks ID 505 in the file management table 500 with the concatenated chunk, and ends the processing. FIG. 5B shows a state of the file management table 500 after "1-2-3" in the constituting chunks ID 505 of a file identified by the file name "sample1.txt" is replaced by the concatenated chunk "9."

In the chunk management table update processing described above, data is stored in the storage device 120 by use of a reconstructed concatenated chunk. Thus, efficiency of storage in the storage device 120 can be improved, and moreover, speed of reading data from the storage device 120 can be improved.

Second Embodiment

Next, a second embodiment of the present invention is described. In the first embodiment described above, in S802 of the data processing flow exemplified in FIG. 8, the chunking module 211 of the standard deduplication function unit 210 performs chunking basically by a chunking method similar to that used in generating sub-chunks. If it is known in advance that, from the properties of data to be stored by the host computer 110 in the storage device 120, sub-chunks hardly appear alone in the data, but appear only as a concatenated chunk, the chunking method can be temporarily changed to output the data as a concatenated chunk without dividing the data into sub-chunks. This chunking method is described below as the second embodiment.

The deduplication device 130 according to the second embodiment has basically the same configuration as that of the first embodiment, and performs similar data processing. The configuration of the second embodiment is described below, with a focus on points different from that of the first embodiment.

The chunk management table 300 (216) used in the second embodiment has a different configuration from that used in the first embodiment. With reference to FIGS. 14A and 14B, an example of a configuration of the chunk management table 300 according to the second embodiment is described. The chunk management table 300 according to the second embodiment includes a skip size 1403 as a new item not included in the first embodiment. The skip size 1403 indicates a data size which is set in advance so that when the chunking module 211 divides new data received from the host computer 110 into chunks, processing for division position search can be skipped. Specifically, in S802 of FIG. 8, the chunking module 211 scans the new data received from the host computer 110 sequentially from the head of the data to search for a division position for dividing the new data into chunks. Assume that the chunking module 211 generates a certain chunk in this event. If it is judged that the generated chunk is the same as a chunk (e.g., "1") registered in the chunk management table 216, the chunking module 211 moves the scan position ahead by 2.3 KB which is the skip size 1403 corresponding thereto. When the chunks "1-2-3" appear successively (this possibility is presumed to be high from the above-described data properties), the chunking module 211 finds a break position at the end of the chunk "3" by the scan after the 2.3 KB skip. As a result, the chunking module outputs a concatenated chunk "1-2-3" as a divided chunk. In S902 of the example of the data processing flow in FIG. 9, the chunk matching module 212 performs matching between the chunk management table 300 and the divided chunk, and judges that the chunk outputted by the chunking module 211 is the same as the concatenated chunk "9."

According to the second embodiment, the skip in the division position judgment enables improvement in the speed of chunking processing and reduction in the number of chunks targeted for matching. The configuration of this embodiment is particularly more effective when the concatenated chunk is longer, and the amount of time required for the deduplication processing can be reduced by reducing the amount of time required for the chunking processing.

The deduplication method of this embodiment described above enables reduction in the amount of time required for data restoration processing without lowering the efficiency of stored data deduplication.

Although the present invention has been described in detail based on the embodiments, the present invention is not limited to those embodiments. Moreover, the scope of the present invention includes equivalents of the invention described in the scope of claims.

REFERENCE SIGNS LIST 1 storage system
101 network
110 host computer
111,131 CPU
112,132 memory
113,122,135 network interface
121 storage control device
123 memory device
124 hard disk
133 auxiliary memory device
134 I/O interface
210 standard deduplication function part
211 chunking module
212 chunk matching module
213 chunk registration module
214 file restoration module
215,500 file management table
216,300 chunk management table
220 chunk concatenation function part
220 chunk pattern analysis module
222 chunk-management-table update module
223,600 chunk pattern information table
224,700 concatenated chunk information table

The invention claimed is:

1. A stored-data deduplication method for eliminating a duplicate data fragment from a storage area in a storage device, the duplicate data fragment being a duplicate of one of data fragments constituting data stored in the storage device, the method comprising:
dividing the data to be stored in the storage device into the data fragments;
recording the data by using configurations of the divided data fragments;
judging whether identical data fragments exist in the data fragments;
when it is judged that the identical data fragments exist, storing one of the identical data fragments in the storage area of the storage device, and generating and recording data-fragment attribute information which is information indicating an attribute unique to the data fragment stored;

upon receipt of a request to read the data stored in the storage area of the storage device, acquiring the configurations of the data fragments forming the read-target data, reading the corresponding data fragments from the storage area of the storage device, and restoring the data;

acquiring and coupling the recorded data fragments to generate concatenation target data targeted for judgment on whether chunk concatenation is possible or not, and detecting whether the concatenation target data has a repeated data pattern which is repetition of a particular data pattern; and using as a concatenated data fragment a sequence of a plurality of the data fragments having the detected repeated data pattern, generating from the concatenated data fragment concatenated-data fragment attribute information indicating an attribute of the concatenated data fragment, and recording the concatenated-data fragment attribute information, wherein the repeated data pattern is not recorded when the number of times the repeated data pattern is detected is less than a predetermined value, and wherein when the detected repeated data pattern contains a plurality of the identical data fragments, the repeated data pattern is divided to avoid having the identical data fragments.

2. The stored data deduplication method according to claim 1, wherein the data-fragment attribute information contains a hash value calculated by applying a predetermined hash function to the corresponding data fragment and storage location information indicating a location in the storage area where the data fragment is stored, and whether there is a duplicate data fragment of any of the data fragments is judged by comparing the hash values of the data fragments.

3. The stored data deduplication method according to claim 2, wherein the storage location information is acquired for each of the plurality of data fragments contained in the concatenated data fragment, and the data fragments contained in the concatenated data fragment are relocated according to the storage location information so that they are stored consecutively on the storage area of the storage device.

4. The stored data deduplication method according to claim 1, wherein when a plurality of the detected repeated data patterns have the identical data fragment, the repeated data patterns other than one repeated data pattern selected according to a predetermined rule are not recorded.

5. The stored data deduplication method according to claim 1, wherein in the acquisition and coupling of the data fragments, the repeated data pattern is not recognized across a break position of the data to be written into or read from the storage device.

6. The stored data deduplication method according to claim 1, wherein in the detection of the repeated data pattern, a break position of the data fragments which is located at a position short of a length of the concatenated data fragment already recorded is not recognized in the detection of the repeated data pattern.

7. A stored-data deduplication apparatus for eliminating a duplicate data fragment from a storage area in a storage device, the duplicate data fragment being a duplicate of one of data fragments constituting data stored in the storage device, the apparatus comprising a processor, a memory, and units implemented when the processor executes a corresponding program on the memory, the units being:

a data division unit configured to divide the data to be stored in the storage device into the data fragments;

a data registration unit configured to record the data by using configurations of the divided data fragments;

a data matching unit configured to judge whether identical data fragments exist in the data fragments, and when it is judged that the identical data fragments exist, store one of the identical data fragments in the storage area of the storage device, and generate and record data-fragment attribute information which is information indicating an attribute unique to the data fragment stored;

a data restoration unit configured to, upon receipt of a request to read the data stored in the storage area of the storage device, acquire the configurations of the data fragments forming the read-target data, read the corresponding data fragments from the storage area of the storage device, and restore the data;

a data analysis unit configured to acquire and couple the recorded data fragments to generate concatenation target data targeted for judgment on whether chunk concatenation is possible or not, and detect whether the concatenation target data has a repeated data pattern which is repetition of a particular data pattern; and a data update unit configured to use as a concatenated data fragment a sequence of a plurality of the data fragments having the detected repeated data pattern, generate from the concatenated data fragment concatenated-data fragment attribute information indicating an attribute of the concatenated data fragment, and record the concatenated-data fragment attribute information, wherein the repeated data pattern is not recorded when the number of times the repeated data pattern is detected is less than a predetermined value, and wherein when the detected repeated data pattern contains a plurality of the identical data fragments, the repeated data pattern is divided to avoid having the identical data fragments.

8. The stored data deduplication apparatus according to claim 7, wherein the data-fragment attribute information contains a hash value calculated by applying a predetermined hash function to the corresponding data fragment and storage location information indicating a location in the storage area where the data fragment is stored, and whether there is a duplicate data fragment of any of the data fragments is judged by comparing the hash values of the data fragments.

9. The stored data deduplication apparatus according to claim 8, wherein the storage location information is acquired for each of the plurality of data fragments contained in the concatenated data fragment, and the data fragments contained in the concatenated data fragment are relocated according to the storage location information so that they are stored consecutively on the storage area of the storage device.

10. The stored data deduplication apparatus according to claim 7, wherein when a plurality of the detected repeated data patterns have the identical data fragment, the repeated data patterns other than one repeated data pattern selected according to a predetermined rule are not recorded.

11. The stored data deduplication apparatus according to claim 8, wherein in the acquisition and coupling of the data fragments, the repeated data pattern is not recognized across a break position of the data to be written into or read from the storage device.

12. The stored data deduplication apparatus according to claim 7, wherein in the detection of the repeated data pattern, a break position of the data fragments which is located at a position short of a length of the concatenated data fragment already recorded is not recognized in the detection of the repeated data pattern.

13. A non-transitory computer readable medium storing a stored-data deduplication program used for eliminating a duplicate data fragment from a storage area in a storage device, the duplicate data fragment being a duplicate of one of data fragments constituting data stored in the storage device, the program causing a computer to execute:

dividing the data to be stored in the storage device into the data fragments;

recording the data by using configurations of the divided data fragments;

judging whether identical data fragments exist in the data fragments;

when it is judged that the identical data fragments exist, storing one of the identical data fragments in the storage area of the storage device, and generating and recording data-fragment attribute information which is information indicating an attribute unique to the data fragment stored;

upon receipt of a request to read the data stored in the storage area of the storage device, acquiring the configurations of the data fragments forming the read-target data, reading the corresponding data fragments from the storage area of the storage device, and restoring the data;

acquiring and coupling the recorded data fragments to generate concatenation target data targeted for judgment on whether chunk concatenation is possible or not, and detecting whether the concatenation target data has a repeated data pattern which is repetition of a particular data pattern; and using as a concatenated data fragment a sequence of a plurality of the data fragments having the detected repeated data pattern, generating from the concatenated data fragment concatenated-data fragment attribute information indicating an attribute of the concatenated data fragment, and recording the concatenated-data fragment attribute information, wherein the repeated data pattern is not recorded when the number of times the repeated data pattern is detected is less than a predetermined value, and wherein when the detected repeated data pattern contains a plurality of the identical data fragments, the repeated data pattern is divided to avoid having the identical data fragments.

\* \* \* \* \*